(12) United States Patent
Kopecek

(10) Patent No.: US 10,865,738 B2
(45) Date of Patent: Dec. 15, 2020

(54) TRAVELING FINGER LOCK FOR AN ACTUATOR

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 109 days.

(21) Appl. No.: 16/286,981

(22) Filed: Feb. 27, 2019

(65) Prior Publication Data
US 2020/0271072 A1 Aug. 27, 2020

(51) Int. Cl.
*F02K 1/76* (2006.01)
*F15B 15/26* (2006.01)
*F16H 25/24* (2006.01)

(52) U.S. Cl.
CPC ............. *F02K 1/763* (2013.01); *F02K 1/766* (2013.01); *F15B 15/26* (2013.01); *F15B 15/261* (2013.01); *F16H 25/2454* (2013.01)

(58) Field of Classification Search
CPC .... F02K 1/763; F02K 1/766; Y10T 74/18704; F16H 25/2454; F15B 15/261
See application file for complete search history.

(56) References Cited

U.S. PATENT DOCUMENTS

| | | | |
|---|---|---|---|
| 2,805,584 A | 9/1957 | Hinsey | |
| 3,040,524 A | 6/1962 | Kurti | |
| 3,186,308 A * | 6/1965 | Butterworth | B60S 9/205 91/169 |
| 3,344,604 A | 10/1967 | Mattia et al. | |
| 3,444,783 A * | 5/1969 | Fredd | F15B 15/261 91/41 |
| 3,500,645 A | 3/1970 | Hom | |

(Continued)

FOREIGN PATENT DOCUMENTS

| EP | 1043492 | 10/2000 |
|---|---|---|
| EP | 1286037 A1 | 2/2003 |

(Continued)

OTHER PUBLICATIONS

U.S. Appl. No. 15/617,227, filed Jun. 8, 2017, Kopecek.

(Continued)

*Primary Examiner* — Andrew H Nguyen
(74) *Attorney, Agent, or Firm* — Fish & Richardson P.C.

(57) ABSTRACT

The subject matter of this specification can be embodied in, among other things, a linear actuator lock apparatus, including a housing having an inner surface defining an axial cavity including a first housing portion where the axial cavity has a first lateral size, a second housing portion where the axial cavity has a second lateral size that is larger than the first lateral size, and a face from the first housing portion to the second housing portion, a piston configured for axial movement within the axial cavity, a lock finger affixed to and extending away from the piston, where a finger end is configured to contact the face when extended and fit within the first housing portion when retracted, and a sleeve configured to move between a position in which the lock finger is permitted to extend and a position configured to contact and retract the lock finger.

20 Claims, 12 Drawing Sheets

(56) References Cited

U.S. PATENT DOCUMENTS

| | | | |
|---|---|---|---|
| 3,511,055 A | | 5/1970 | Timms |
| 4,391,409 A | | 7/1983 | Scholz |
| 4,421,349 A | * | 12/1983 | Greiert, Jr. ............. B64D 29/06 |
| | | | 292/113 |
| 4,922,713 A | | 5/1990 | Barbarin et al. |
| 5,257,840 A | | 11/1993 | Rouzaud |
| 5,404,714 A | | 4/1995 | Davies |
| 5,431,085 A | * | 7/1995 | Geffray ................. F02K 1/766 |
| | | | 91/44 |
| 5,642,636 A | | 7/1997 | Mitsui |
| 6,021,636 A | | 2/2000 | Johnson et al. |
| 6,089,626 A | | 7/2000 | Shoemaker |
| 6,487,846 B1 | | 12/2002 | Chakkera et al. |
| 6,517,041 B2 | | 2/2003 | Raum |
| 6,584,763 B2 | | 7/2003 | Lymons et al. |
| 7,409,820 B2 | | 8/2008 | Ahrendt |
| 8,018,696 B2 | | 9/2011 | Ahrendt |
| 8,713,911 B2 | | 5/2014 | Kopecek et al. |
| 8,919,668 B2 | | 12/2014 | Vauchel |
| 9,109,536 B2 | | 8/2015 | Willett |
| 9,249,756 B2 | | 2/2016 | Caruel |
| 9,458,794 B2 | | 10/2016 | Hue et al. |
| 9,587,516 B2 | | 3/2017 | Fabre et al. |
| 1,005,407 A1 | | 8/2018 | Kopecek et al. |
| 2007/0273159 A1 | | 11/2007 | Rouyer |
| 2008/0073172 A1 | | 3/2008 | Ho |
| 2010/0089191 A1 | | 4/2010 | Marin Martinod |
| 2013/0263600 A1 | * | 10/2013 | Vauchel ................. F02K 1/766 |
| | | | 60/722 |
| 2013/0292489 A1 | | 11/2013 | Vauchel et al. |
| 2014/0270935 A1 | | 9/2014 | Willett et al. |
| 2015/0267639 A1 | | 9/2015 | Gormley |
| 2018/0066607 A1 | | 3/2018 | Sawyers-Abbott et al. |
| 2018/0202390 A1 | | 7/2018 | Kopecek et al. |

FOREIGN PATENT DOCUMENTS

| | | |
|---|---|---|
| EP | 3284677 | 2/2018 |
| FR | 2970521 A1 | 7/2012 |
| GB | 404618 A | 1/1934 |
| WO | WO2001109674 | 3/2001 |
| WO | WO 2005/040589 A2 | 5/2005 |
| WO | WO20140196985 | 12/2014 |
| WO | WO20150096000 | 7/2015 |
| WO | WO20160024274 | 2/2016 |

OTHER PUBLICATIONS

U.S. Appl. No. 16/149,455, filed Oct. 2, 2018, Kopecek.
International Search Report and Written Opinion in the International Application No. PCT/US2019/053831, dated Dec. 2, 2019, 6 pages.
International Search Report and Written Opinion in the International Application No. PCT/US2020/019902, dated Jun. 22, 2020, 16 pages.
PCT International Search Report and Written Opinion of the International Searching Authority issued in International Application No. PCT/US2016/036381 dated Aug. 26, 2016; 16 pages.

* cited by examiner

TRAVELING FINGER LOCK FOR AN ACTUATOR

TECHNICAL FIELD

This instant specification relates to an aircraft engine thrust reverser lock.

BACKGROUND

Contemporary aircraft engines may include a thrust reverse actuation system to assist in reducing the aircraft speed during landing. Typical thrust reversers include a movable transcowl that, when in the active position, reverses at least a portion of the airflow passing through the engine.

Accidental or inadvertent activation and deployment of thrust reversers at inappropriate times can be dangerous or deadly. Accidental deployment on the ground while ground crews are performing service on the engine can result in injury or death. Accidental activation during flight can cause a catastrophic loss of airspeed or failure of the airframe. Mechanical malfunctions, such as a loss of hydraulic pressure, can also allow a reverser to move out of the stowed position at an inappropriate time.

To prevent accidental or unintentional thrust reverser deployment, locking mechanisms are used. Before the thrust reverser can be moved from its stowed position, the lock must first be disengaged. Some current reverser lock designs implement rotating jaws to engage a probe. Such designs can be heavy and mechanically complex, which adds weight and maintenance requirements to the aircraft on which they are installed.

SUMMARY

In general, this document describes an aircraft engine thrust reverser lock.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a linear actuator lock apparatus, including a housing having an inner surface defining an axial cavity including a first housing portion where the axial cavity has a first lateral size, a second housing portion where the axial cavity has a second lateral size that is larger than the first lateral size, and a face defined by the inner surface from the first housing portion to the second housing portion, a piston having a first piston end and a second piston end axially opposite the first piston end, where the piston is configured for axial movement within the axial cavity between a first piston position and a second piston position, a lock finger affixed to the first piston end at a first finger end and extending away from the piston to a second finger end, where the second finger end is configured to contact the face in an extended configuration and fit within the first housing portion in a retracted configuration, and a sleeve arranged within the second housing portion and configured to move axially within the second housing portion between a first sleeve position in which the lock finger is permitted to extend to the extended configuration and a second sleeve position configured to contact the lock finger and urge the lock finger to the retracted configuration. Other embodiments of this aspect include corresponding computer systems, apparatus, and computer programs recorded on one or more computer storage devices, each configured to perform the actions of the methods.

Implementations may include one or more of the following features. The apparatus where the second finger end can be configured to contact the face axially and to contact the piston axially in the extended configuration. The apparatus where the lock finger can be configured to prevent movement of the piston toward the second piston position in the extended configuration, and permit movement of the piston toward the second piston position in the retracted configuration. The apparatus can also include a bias member configured to bias the lock finger away from the retracted configuration and toward the extended configuration. The sleeve can define an axial bore, and the first piston end can be configured to at least partly extend within the axial bore in the second sleeve position. The apparatus can include a first seal arranged in sealing contact with the inner surface and an outer surface of the sleeve, and a second seal arranged in sealing contact with the inner surface and the outer surface of the sleeve, where a pressure chamber is defined by the inner surface, the face, the outer surface, the first seal, and the second seal. The apparatus can include a bias member configured to urge the sleeve toward the first sleeve position. The apparatus can include a pressure chamber at least partly defined by the inner surface, the piston, and a piston seal arranged in sealing contact with the piston and the inner surface. The apparatus where the piston can be configured to be urged from the first piston position toward the second piston position by fluid pressure provided within the pressure chamber. The apparatus where the sleeve can be configured to be urged from the first sleeve position toward the second sleeve position by fluid pressure provided within the pressure chamber. The apparatus where the housing can be configured to be affixed to an aircraft structure and the second piston end is configured to be affixed to a moveable aircraft component. Implementations of the described techniques may include hardware, a method or process, or computer software on a computer-accessible medium.

Another general aspect includes a method of locking a linear actuator, the method including urging axial movement of a piston within an axial cavity defined by an inner surface of a housing, away from a first piston position and toward a second piston position, where the piston has a first piston end and a second piston end axially opposite the first piston end, urging, by the piston, axial movement of a lock finger affixed to the first piston end at a first finger end and extending away from the piston to a second finger end in an extended configuration, contacting, by the second finger end, a face defined by the inner surface between a first housing portion where the axial cavity has a first lateral size to a second housing portion where the axial cavity has a second lateral size that is larger than the first lateral size, preventing, by the contacting, movement of the piston to the second piston position, urging movement of a sleeve axially from a first sleeve position to a second sleeve position within the axial cavity, contacting, by the sleeve, the lock finger, urging, by the sleeve, the lock finger from the extended configuration to a retracted configuration in which the lock finger fits within the first housing portion, and moving the piston to the second piston position. Other embodiments of this aspect include corresponding computer systems, apparatus, and computer programs recorded on one or more computer storage devices, each configured to perform the actions of the methods.

Implementations may include one or more of the following features. The method where urging axial movement of the piston within the axial cavity defined by the inner surface of the housing away from the first piston position toward the second piston position can also include applying fluid pressure to a pressure chamber that is at least partly defined by the inner surface, the piston, and a piston seal arranged in sealing contact with the piston and the inner surface. The method where urging movement of the sleeve axially from the second sleeve position to the first sleeve position within the axial cavity can also include urging movement of the sleeve by a spring bias. The method can also include urging movement of the sleeve axially from the second sleeve position to the first sleeve position within the axial cavity, urging the piston away from the second piston position to the first piston position, passing the second finger end out of the first housing portion, past the face, into the second housing portion, and extending the lock finger away from the piston from the retracted configuration to the extended configuration. The method where extending the lock finger away from the piston from the retracted configuration to the extended configuration can include extending, by a bias member, the lock finger away from the piston from the retracted configuration to the extended configuration. The method where urging movement of the sleeve axially from the second sleeve position to the first sleeve position within the axial cavity can include applying fluid pressure to a pressure chamber defined by the inner surface, an outer surface of the sleeve, a first seal arranged in sealing contact with the inner surface and the outer surface of the sleeve, and a second seal arranged in sealing contact with the inner surface and the outer surface of the sleeve. The method where urging movement of the sleeve axially from the second sleeve position to the first sleeve position within the axial cavity can include urging movement of the sleeve by a bias member configured to urge movement of the sleeve axially from the second sleeve position to the first sleeve position. The method where preventing, by the contacting, movement of the piston to the second piston position can include contacting, by the second finger end, a second face defined by the piston, and transferring, by the second finger end, an axial force of the piston to the housing. Implementations of the described techniques may include hardware, a method or process, or computer software on a computer-accessible medium.

Another general aspect includes a thrust reverser actuator system including an airframe structure, a thrust reverser cowl configured to move relative to the airframe structure, a linear actuator configured to move the thrust reverser cowl relative to the airframe structure, and including, a housing having an inner surface defining an axial cavity including, a first housing portion where the axial cavity has a first lateral size, a second housing portion where the axial cavity has a second lateral size that is larger than the first lateral size, and a face defined by the inner surface from the first housing portion to the second housing portion, a piston having a first piston end and a second piston end axially opposite the first piston end, where the piston is configured for axial movement within the axial cavity between a first piston position and a second piston position, and a lock apparatus including, a lock finger affixed to the first piston end at a first finger end and extending away from the piston to a second finger end, where the second finger end is configured to contact the face in an extended configuration and fit within the first housing portion in a retracted configuration, and a sleeve arranged within the second housing portion and configured to move axially within the second housing portion between a first sleeve position in which the lock finger is permitted to extend to the extended configuration and a second sleeve position configured to contact the lock finger and urge the lock finger to the retracted configuration. Other embodiments of this aspect include corresponding computer systems, apparatus, and computer programs recorded on one or more computer storage devices, each configured to perform the actions of the methods.

Implementations may include one or more of the following features. The system where the lock finger can be configured to prevent movement of the piston toward the second piston position in the extended configuration, and permit movement of the piston toward the second piston position in the retracted configuration. The system can include a pressure chamber at least partly defined by the inner surface, the piston, and a piston seal arranged in sealing contact with the piston and the inner surface, where the piston can be configured to be urged from the first piston position toward the second piston position by fluid pressure provided within the pressure chamber. The system may also include hardware, a method or process, or computer software on a computer-accessible medium.

The systems and techniques described here may provide one or more of the following advantages. First, a system can provide a lock mechanism having a short lock load path. Second, the system is less prone to fatigue due the flexure. Third, the lock fingers are not size-limited by flexure requirements. Fourth, lock loads do not use the lock fingers as a primary load path.

The details of one or more implementations are set forth in the accompanying drawings and the description below. Other features and advantages will be apparent from the description and drawings, and from the claims.

DETAILED DESCRIPTION

This document describes systems and techniques for reversing aircraft turbine engine airflow. A thrust reverser with at least one movable element, which is movable to and from a reversing position, may be used to change the direction of the bypass airflow. In the reversing position, the movable element may be configured to reverse at least a portion of the bypass airflow.

Locking mechanisms engage the thrust reversers to prevent accidental activation or accidental deployment (e.g., during flight, during ground maintenance operations). The paragraphs below describe a mechanism that provides such locking in an assembly that is relatively lighter and less complex than existing designs.

Figure 1:
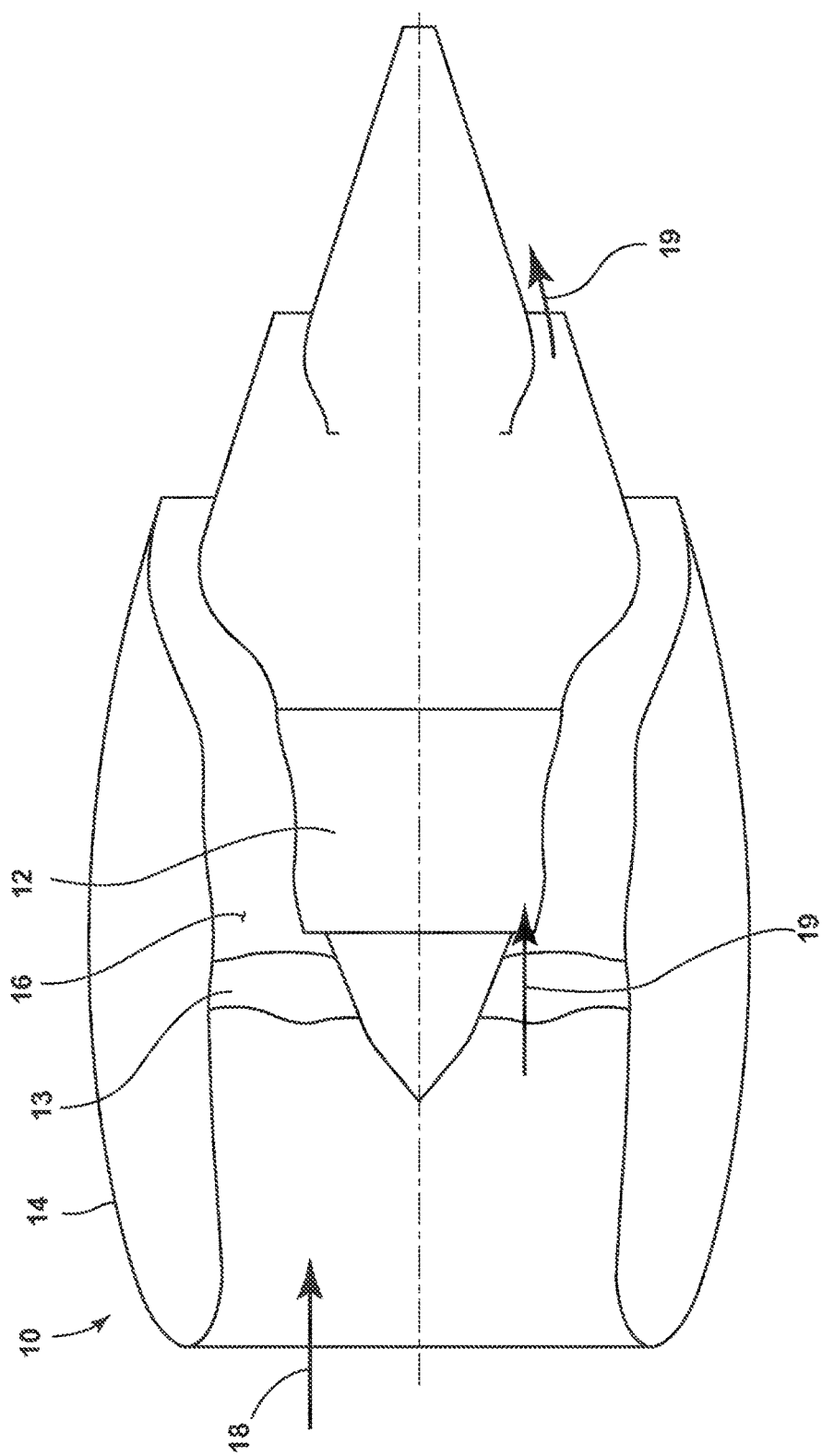
FIG. 1 is a schematic view of an example turbofan jet engine with a portion of the outer nacelle cut away for clarity.

FIG. 1 illustrates an example turbofan jet engine assembly 10 having a turbine engine 12, a fan assembly 13, and a nacelle 14 (e.g., an airframe structure). Portions of the nacelle 14 have been cut away for clarity. The nacelle 14 surrounds the turbine engine 12 and defines an annular airflow path or annular bypass duct 16 through the jet engine assembly 10 to define a generally forward-to-aft bypass airflow path as schematically illustrated by the arrow 18. A combustion airflow is schematically illustrated by the arrows 19.

Figure 2:
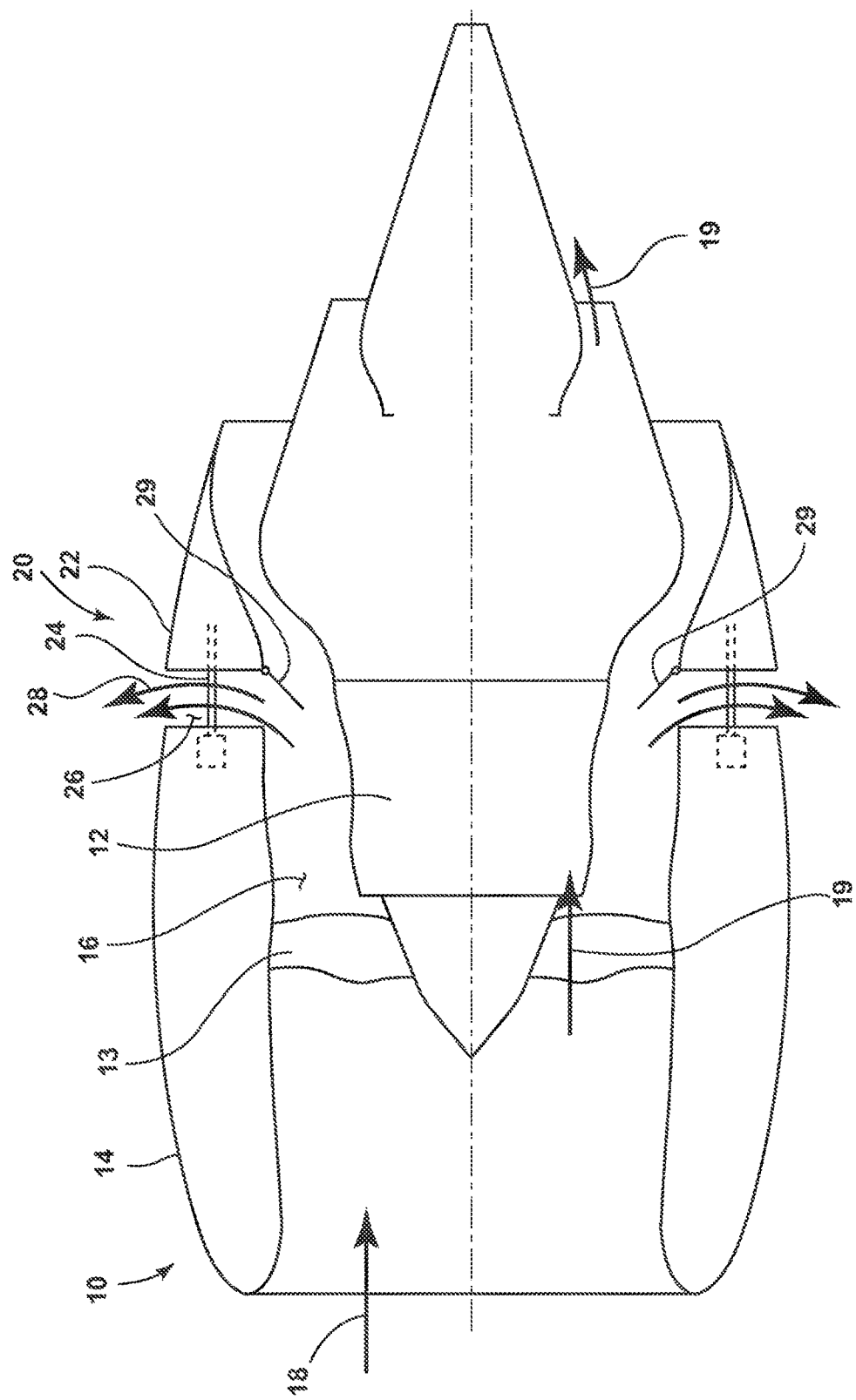
FIG. 2 is a schematic view of the engine of FIG. 1 with an exemplary thrust reverser.

A thrust reverser with at least one movable element, which is movable to and from a reversing position, may be used to change the direction of the bypass airflow. In the reversing position, the movable element may be configured to reverse at least a portion of the bypass airflow. There are several methods of obtaining reverse thrust on turbofan jet engine assemblies. FIG. 2 schematically illustrates one example of a thrust reverser 20 that may be used in the turbofan jet engine assembly 10. The thrust reverser 20 includes a movable element 22. The movable element 22 has been illustrated as a cowl portion that is capable of axial motion with respect to the forward portion of the nacelle 14. A hydraulic actuator 24 may be coupled to the movable element 22 to move the movable element 22 into and out of the reversing position. In the reversing position, as illustrated, the movable element 22 limits the annular bypass area between the movable element 22 and the turbine engine 12, it also opens up a portion 26 between the movable element 22 and the forward portion of the nacelle 14 such that the air flow path may be reversed as illustrated by the arrows 28. An optional deflector or flap (also known as a blocker door) 29 may be included to aid in directing the airflow path between the movable element 22 and the forward portion of the nacelle 14.

Figure 3:
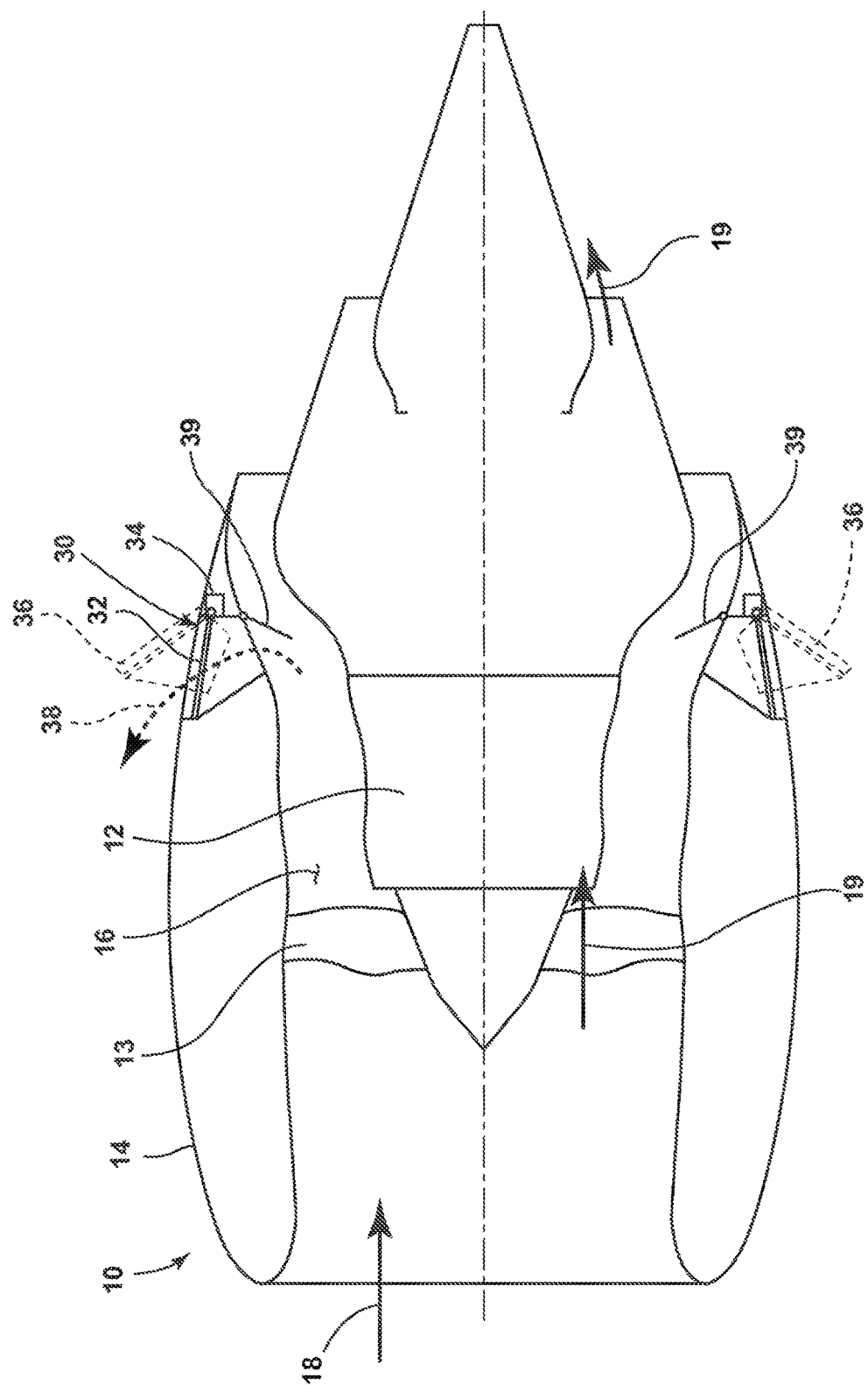
FIG. 3 is a schematic view of the engine of FIG. 1 with an alternative exemplary thrust reverser.

FIG. 3 schematically illustrates an alternative example of a thrust reverser 30. The thrust reverser 30 includes a movable element 32. The movable element 32 has been illustrated as a deflector, which may be built into a portion of the nacelle 14. A hydraulic actuator 34 may be coupled to the movable element 32 to move the movable element 32 into and out of the reversing position. In the reversing position, shown in phantom and indicated at 36, the movable element 32 turns that air outward and forward to reverse its direction as illustrated by the arrows 38. An optional deflector, blocker door, or flap 39 may be included to aid in directing the airflow path outward.

In both illustrative examples, the thrust reverser changes the direction of the thrust force. Both the thrust reverser 20 and the thrust reverser 30 have been described as hydraulically operated systems and a hydraulic actuator has been schematically illustrated. In some embodiments, the thrust reverser 20 and/or the thrust reverser 30 can be powered by other fluids (e.g., pneumatic), by electro-mechanical actuators, or by any other appropriate power source or actuator type.

Figure 4:
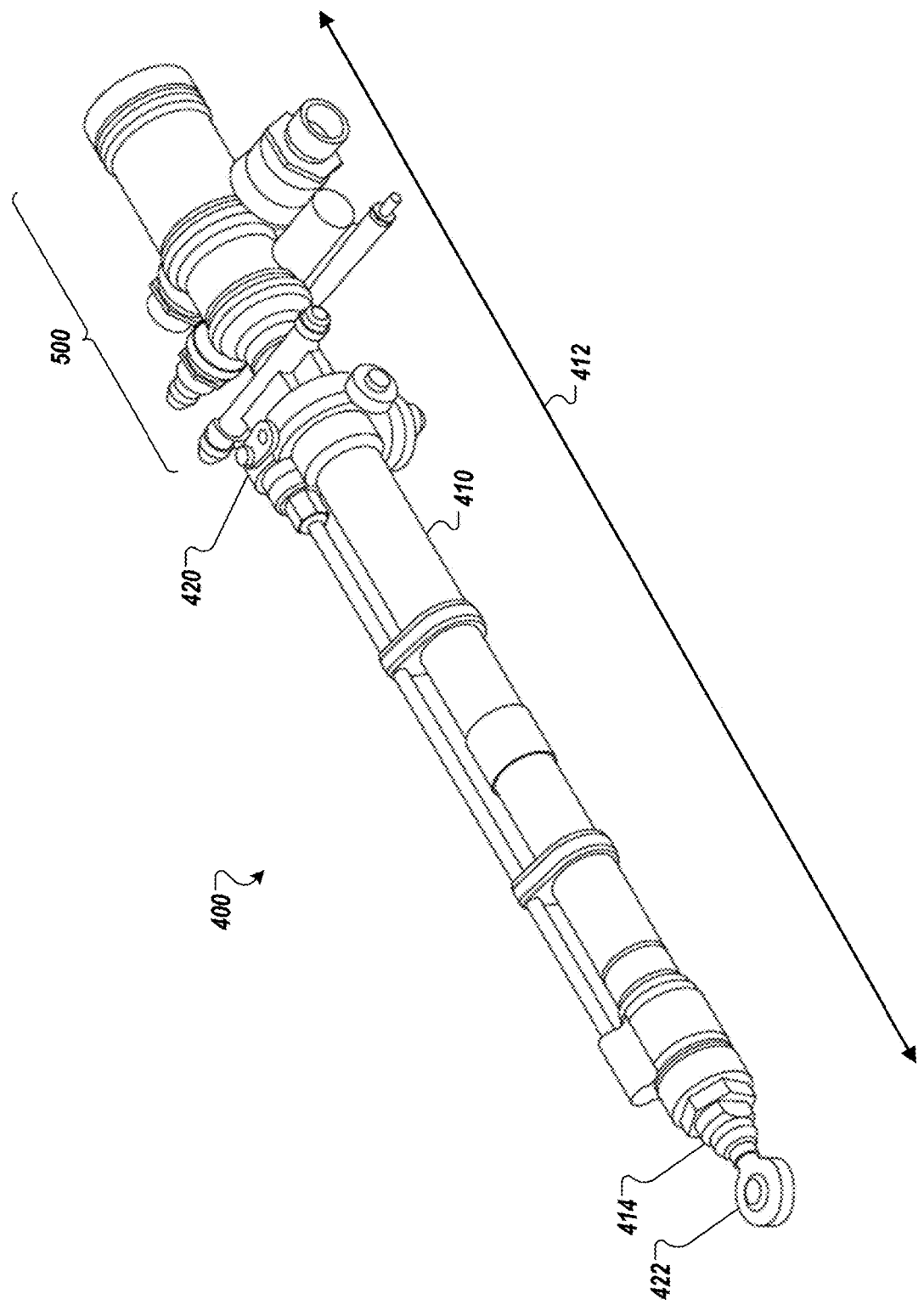
FIG. 4 is a projected view of an exemplary linear hydraulic actuator.

FIG. 4 is a projected view of an exemplary linear hydraulic actuator 400. In some examples, the hydraulic actuator 400 can be the hydraulic actuator 24 of FIG. 2 or the hydraulic actuator 34 of FIG. 3.

The hydraulic actuator 400 includes a housing 410 having an axial length, represented by arrow 412. The hydraulic actuator 400 is configured as a linear actuator, in which a piston rod 414 can be extended and retracted axially relative to the housing 410.

The hydraulic actuator 400 includes a mount 420 that is configured for attachment to an aircraft or airframe structure, such as the example nacelle 14. The hydraulic actuator 400 also includes a mount 422 that is configured for attachment to an aircraft structure, such as the example moveable element 22. In use, axial movement of the piston rod 414 causes movement of the moveable element 22 relative to the nacelle 14.

As will be discussed in the descriptions of FIGS. 5-9, the housing 410 defines one or more tubular cavities that form portions of pressure chambers that can be pressurized to perform moving and locking operations of the hydraulic actuator. The hydraulic actuator 400 also includes a linear lock assembly 500 that is configured to selectively prevent and allow axial movement of the piston rod 414. The remainder of this specification discusses the linear lock assembly 500 in more detail.

Figure 5:
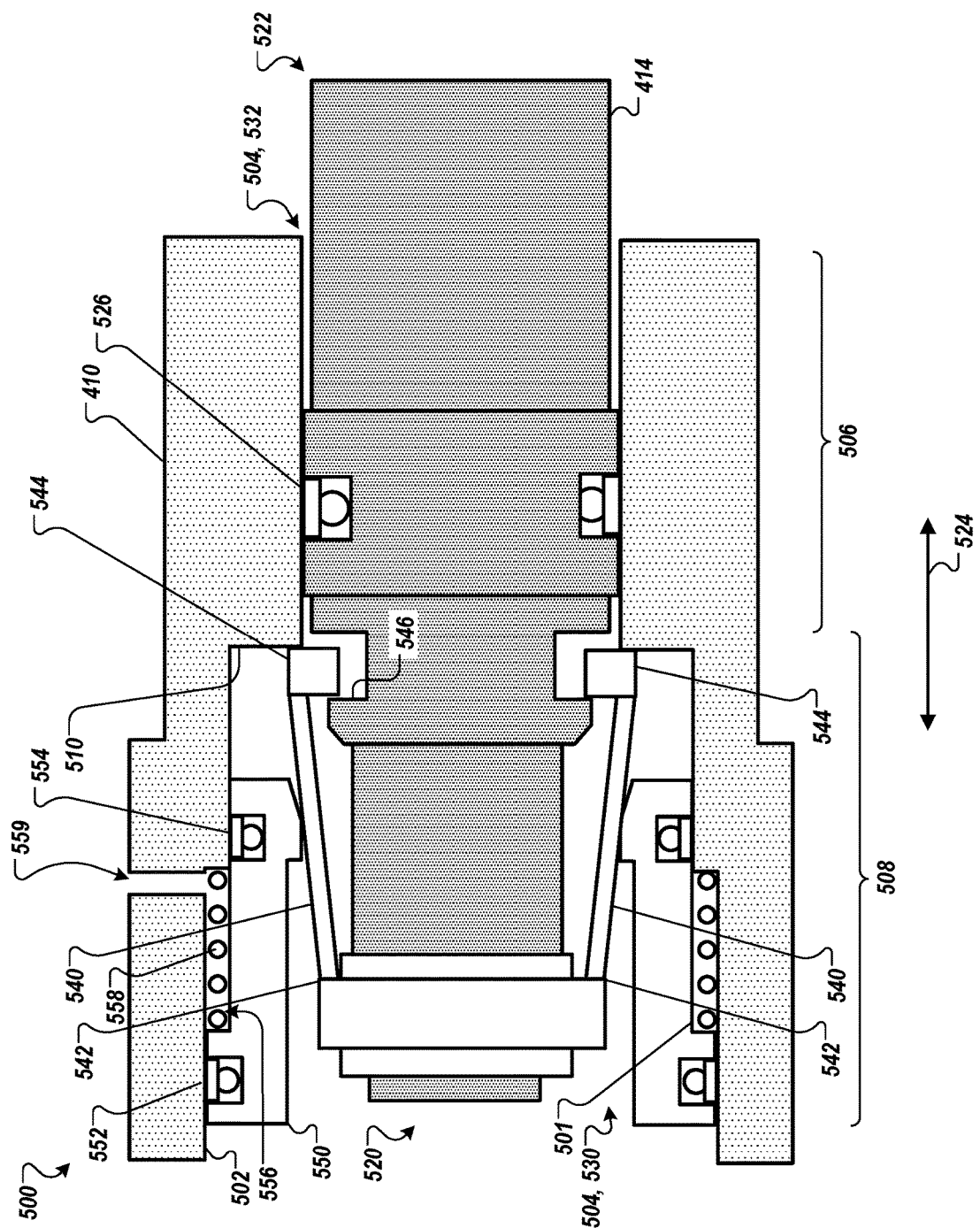
FIGS. 5-9 are sectional views of an exemplary linear lock assembly.

FIGS. 5-9 are sectional side views of the exemplary linear lock assembly 500 apparatus in various operational configurations. FIG. 5 shows the linear lock assembly in a locked configuration. The views of FIGS. 5-9 shows a portion of the housing 410 and a portion of the piston rod 414.

The housing 414 has an inner surface 502 defining an axial cavity 504. The housing 410 includes a housing portion 506 and a housing portion 508. Along the interior of the housing portion 506, the axial cavity 504 has a first lateral size (e.g., diameter, cross sectional area). Along the interior of the housing portion 508, the axial cavity 504 has a second lateral size that is larger than the first lateral size (e.g., has a relatively larger diameter or cross-sectional area). At a junction where the housing portion 506 and the housing portion 508 meet, a face 510 is defined by the radial transition of inner surface 502 from the relatively smaller interior cavity size of the housing portion 506 to the relatively lager interior cavity size of the housing portion 508.

Figure 6:
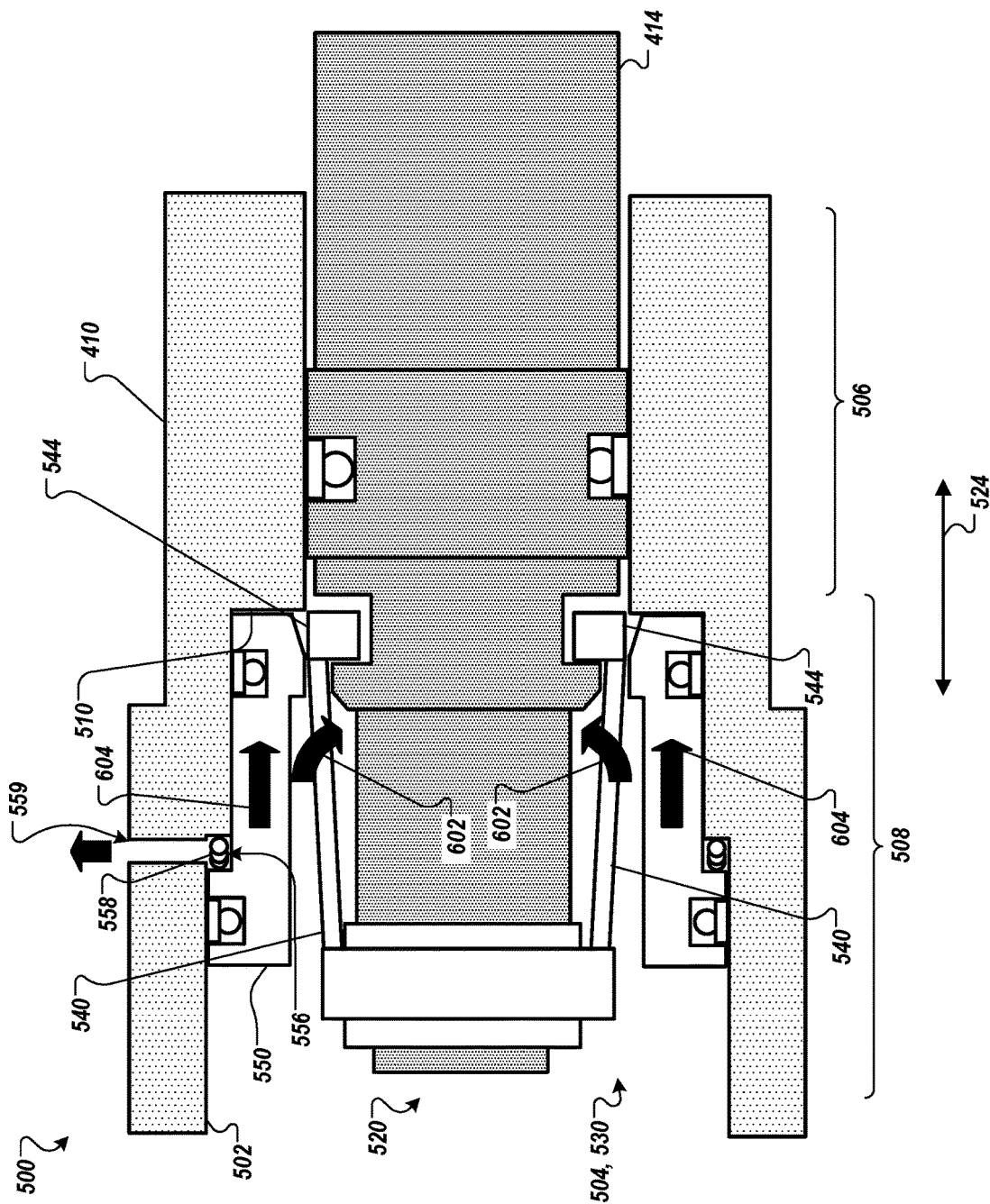
Figure 7:
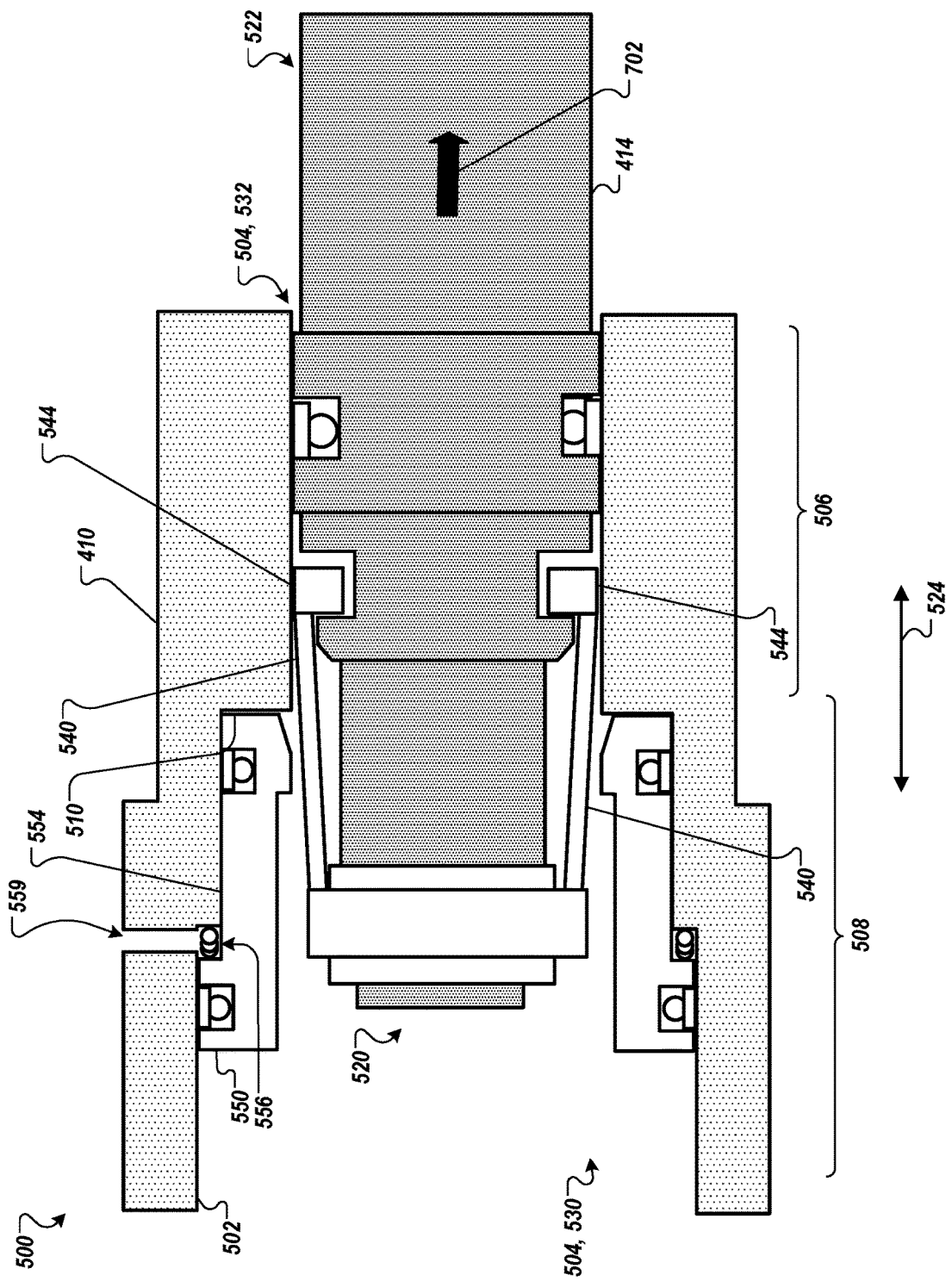
Figure 8:
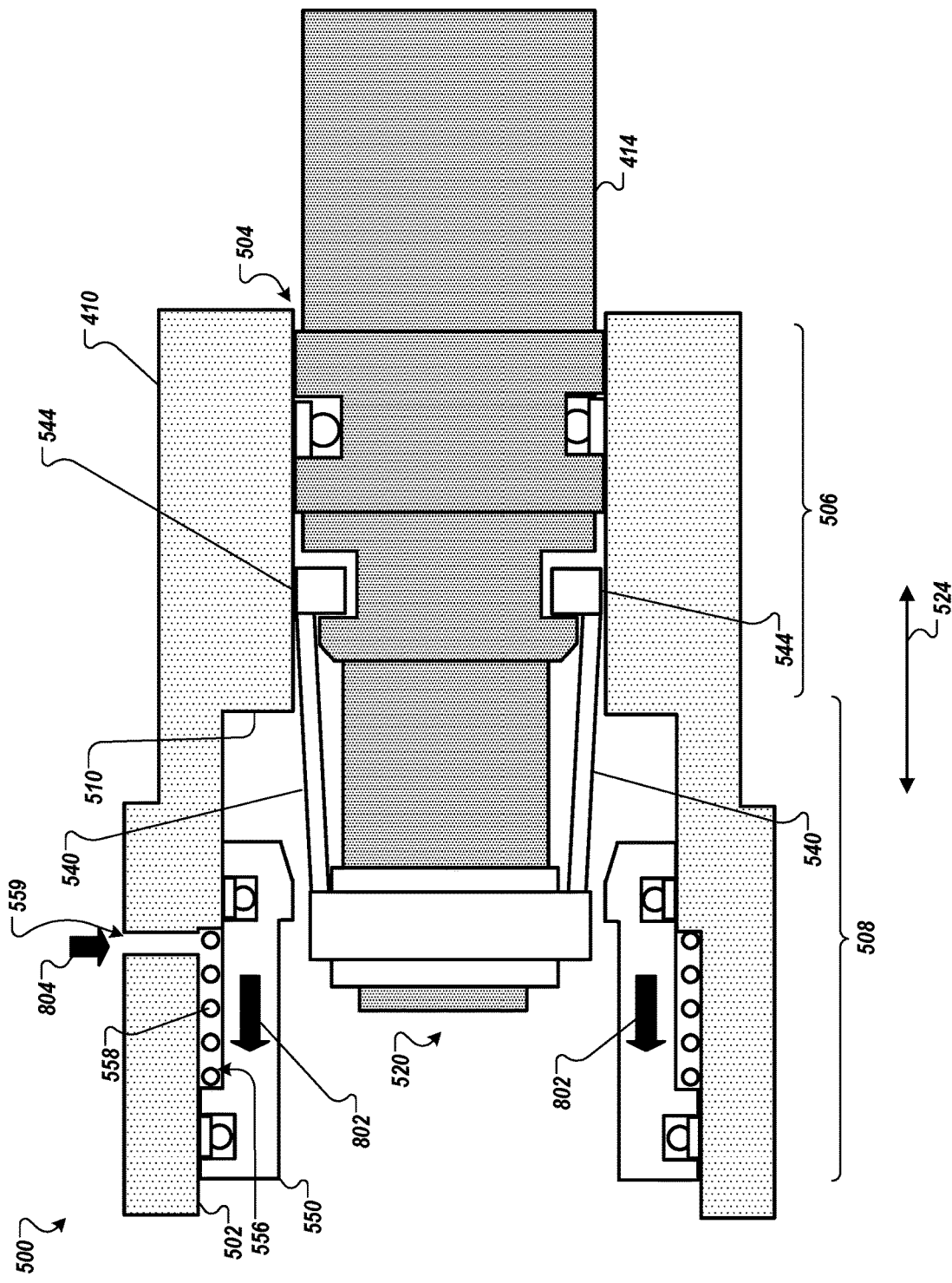
Figure 9:
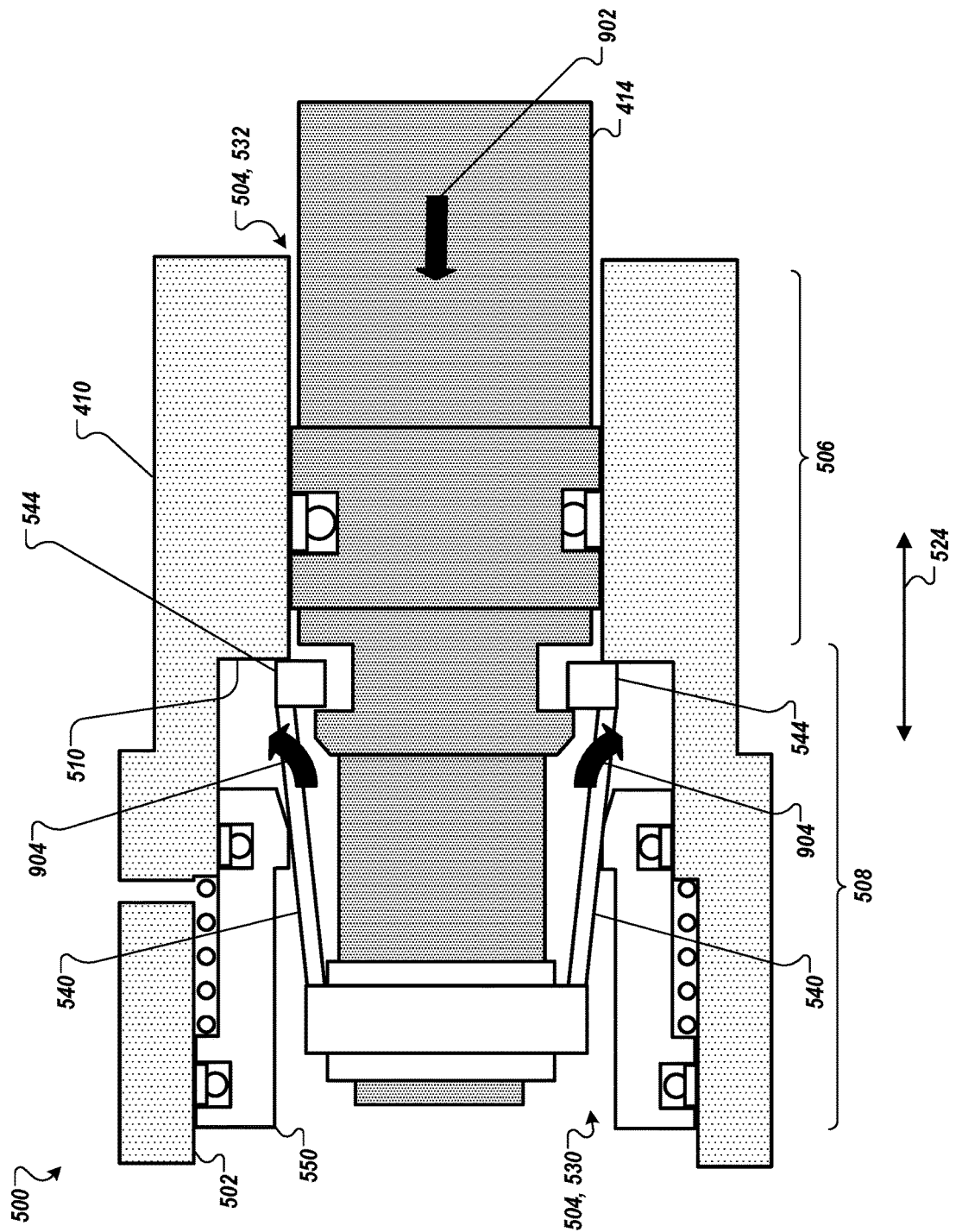

The piston rod 414 has a piston end 520 and a piston end 522 axially opposite the piston end 520. The piston rod 414 is configured for axial movement along an axial direction, represented by arrow 524 within the axial cavity 504 between a first piston position (e.g., as shown in FIGS. 5, 6, and 9) and a second piston position (e.g., as shown in FIGS. 7-8). A piston seal assembly 526 provides a fluid seal between the piston rod 414 and the inner surface 502 of the housing portion 506. The piston seal assembly 526, the piston rod 414 and the inner surface 502 define a portion of a pressure chamber 530 on one side of the seal assembly 526, and define a portion of a pressure chamber 532 on the axially opposite side of the seal assembly 526. In operation, the piston rod 414 can be extended by applying pressurized fluid (e.g., hydraulic fluid) to the pressure chamber 530, and can be retracted by applying pressurized fluid to the pressure chamber 532.

Each of a collection of lock fingers 540 are affixed to the piston end 520 at a finger end 542 and extend away from the piston rod 414 to a finger end 544. The finger end 544 is configured to contact the face 510 when the lock finger 540 is in an extended configuration (e.g., as shown in FIGS. 5 and 9), and fit within the housing portion 506 when the lock finger 540 is in a retracted configuration (e.g., as shown in FIGS. 6-8).

The lock fingers 540 are configured to be biased toward the locked configuration. In some embodiments, the finger ends 542 can be fixed to the piston end 520 and the lock finger 540 can be formed of a compliant (e.g., spring) material that can bend and allow the finger end 544 to move between the extended and retracted positions. In some embodiments, the lock finger 540 can be substantially rigid and the finger ends 542 can be configured to pivot or hinge at the piston end 520, and a spring or other compliant material that can be configured to bias the finger end 544 toward the extended position.

A sleeve 550 is arranged within the second housing portion and configured to move axially within the housing portion 508 between a first sleeve position (e.g., as shown in FIGS. 5, 8, and 9) in which the lock fingers 540 are permitted to extend to the extended configuration, and a second sleeve position configured to contact the lock fingers 540 and urge the lock fingers 540 to the retracted configuration (e.g., as shown in FIGS. 6 and 7).

The sleeve 550 includes a seal assembly 552 and a seal assembly 554. The inner surface 502, an outer surface 551 of the sleeve 550, the seal assembly 552, and the seal assembly 554 define a pressure chamber 556. A compliant member 558 (e.g., a spring) is configured to bias the sleeve 550 toward the second sleeve position. In use, the sleeve 550 is moved from the second sleeve position to the first sleeve position by applying fluid pressure to the pressure chamber 556 through a port 559.

With reference to FIGS. 5-9, an example operational cycle of the linear lock assembly 500 will be described. In FIG. 5, the piston rod 414 is shown in a retracted configuration and the linear lock assembly 500 is shown in a locked configuration. In the locked configuration, the piston rod 414 is prevented from extending by the finger ends 544. If an attempt were made to extend the piston rod 414 with the lock fingers 540 in the extended, locked configuration, the finger ends 544 come into interfering contact with the face 510. Extensile movement of the piston rod 414 is prevented by at least one of two different ways.

In one example, an axially leading side of one or more of the finger ends 544 can contact the face 510, and an axial face portion 546 of the piston can contact an axially trailing side of the finger end 544. As such, the force acting upon the piston rod 414 is transferred through the axial face portion 546, to the finger end 544, to the face 510 of the housing 410. Such mechanical interference substantially prevents the piston rod 414 from extending further.

In another example, the force acting upon the piston rod 414 can be transferred through the finger end 542, along the lock finger 540 to the finger end 544, and then to the face 510 of the housing 410. Such mechanical interference substantially prevents the piston rod 414 from extending further.

Referring now to FIG. 6, the piston rod 414 is shown in a retracted configuration and the linear lock assembly 500 is shown in an unlocked configuration. In the unlocked configuration, the lock fingers 540 are retracted (as represented by arrows 602) such that the finger ends 544 fit within the axial cavity 504 of the housing portion 506.

The lock fingers 540 are moved from the locked configuration (e.g., shown in FIG. 5) to the unlocked configuration (e.g., shown in FIG. 6) by the sleeve 550. Fluid pressure, blocked in the pressure chamber 556, is allowed to flow out of the port 559. With the fluid blocking removed, the compliant member 558 urges axial movement, represented by arrows 604, of the sleeve 550 from the locked position (e.g., as shown in FIG. 5) to the unlocked position (e.g., as shown in FIG. 6). As the sleeve 550 moves, the sleeve 550 contacts the lock fingers 540 and urges the retraction of the lock fingers 540 from the extended, locked configuration to the retracted, unlocked configuration.

Referring now to FIG. 7, the piston rod 414 is shown in an extended configuration with the linear lock assembly 500 shown in an unlocked configuration. In operation, the piston rod 414 can be urged from the retracted position toward the extended position by applying fluid pressure to the pressure chamber 530. With the lock fingers in the retracted, unlocked configuration, the finger ends 544 fit within the axial cavity 504 of the housing portion 506 and do not come into mechanical contact with the face 510 as the piston rod 414 is moved, as represented by arrow 702, from the retracted position (e.g., as shown in FIGS. 5 and 6) toward an extended position (e.g., as shown in FIG. 7).

Referring now to FIG. 8, the piston rod 414 is shown in an extended configuration with the linear lock assembly 500 shown in the unlocked configuration and the sleeve 550 in the locked position. When the piston rod 414 is in the extended configuration, the finger ends 544 fit within the axial cavity 504 of the housing portion 506. The axial cavity 504 prevents the finger ends 544 from extending due to the bias of the lock fingers 540, and as such keeps the lock fingers 540 retracted regardless of the position of the sleeve 550.

In the current example, with the lock fingers 540 held in the unlocked position by the axial cavity 504, the sleeve 550 can be moved without affecting the configuration of the lock fingers 540. The sleeve 550 can be moved away, as represented by arrows 802, from the unlocked configuration (e.g., as shown in FIGS. 6 and 7) toward the locked configuration (e.g., as shown in FIGS. 5, 8, and 9).

The sleeve 550 is moved toward the locked configuration by applying pressurized fluid to the pressure chamber 556 through the port 559, as represented by arrow 804. When the pressure in the pressure chamber 556 is sufficient to overcome the bias of the compliant member 558, the sleeve 550 will move to the unlocked position.

Referring now to FIG. 9, the piston rod 414 is shown in the retracted configuration with the linear lock assembly 500 shown in the locked configuration and the sleeve 550 in the locked position. In operation, the piston rod 414 can be urged from the extended position toward the retracted position by applying fluid pressure to the pressure chamber 532. With the lock fingers in the retracted, unlocked configuration, the finger ends 544 fit within the axial cavity 504 of the housing portion 506 and will be kept in the unlocked configuration. As the piston rod 414 is moved, as represented by arrow 902, from the extended position (e.g., as shown in FIGS. 7 and 8) toward an extended position (e.g., as shown in FIGS. 5, 6, and 9), the finger ends 544 eventually pass out of the housing portion 506 into the housing portion 508. Once the finger ends 544 have cleared the housing portion 506, the axial cavity 504 will no longer retain the lock fingers 540 in the unlocked position against the bias of the lock fingers 540. As such, the bias of the lock fingers 540 causes the lock fingers 540 to extend, as represented by arrows 904, to the locked configuration.

Figure 10:
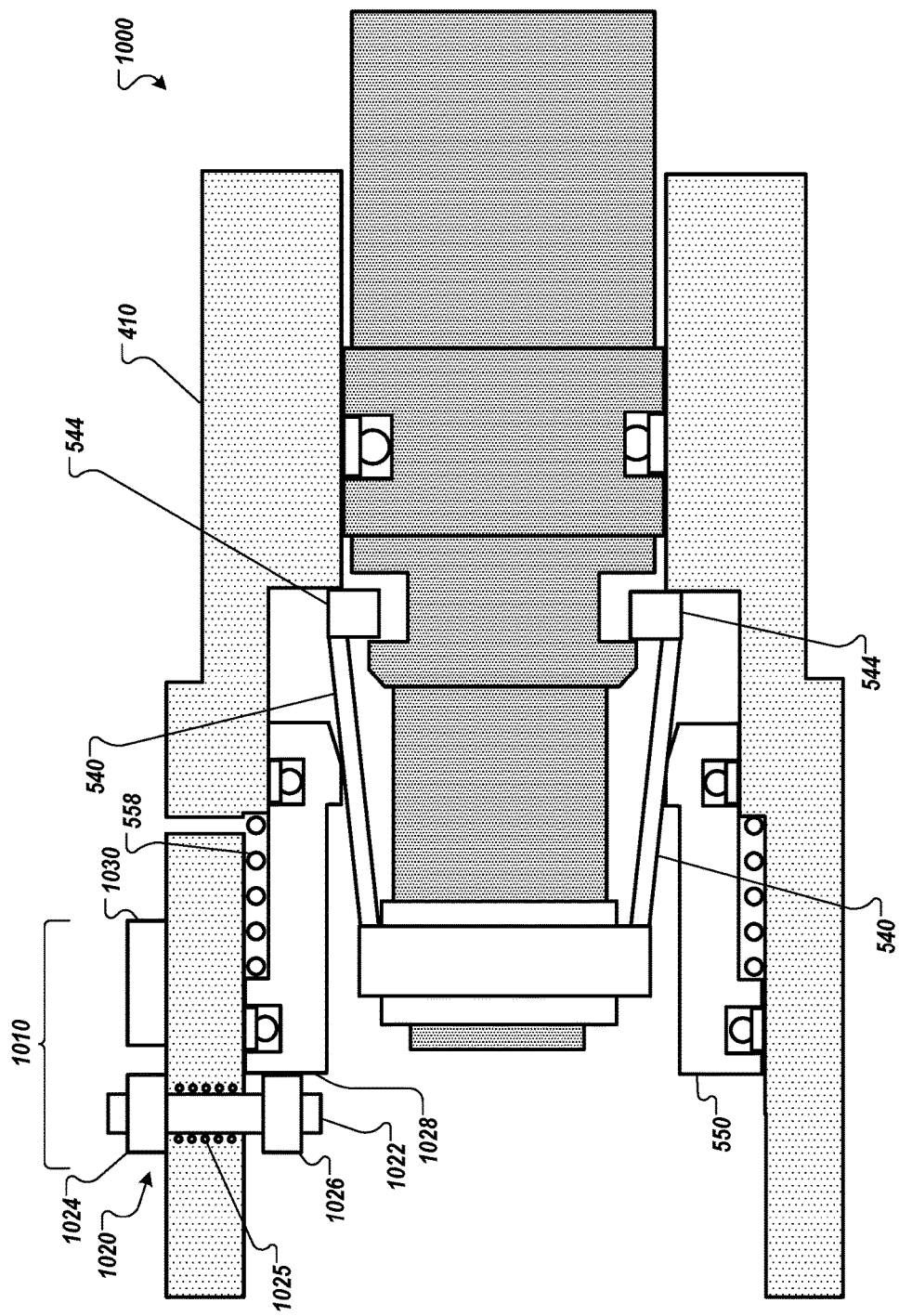
FIGS. 10 and 11 are sectional views of another exemplary linear lock assembly.
Figure 11:
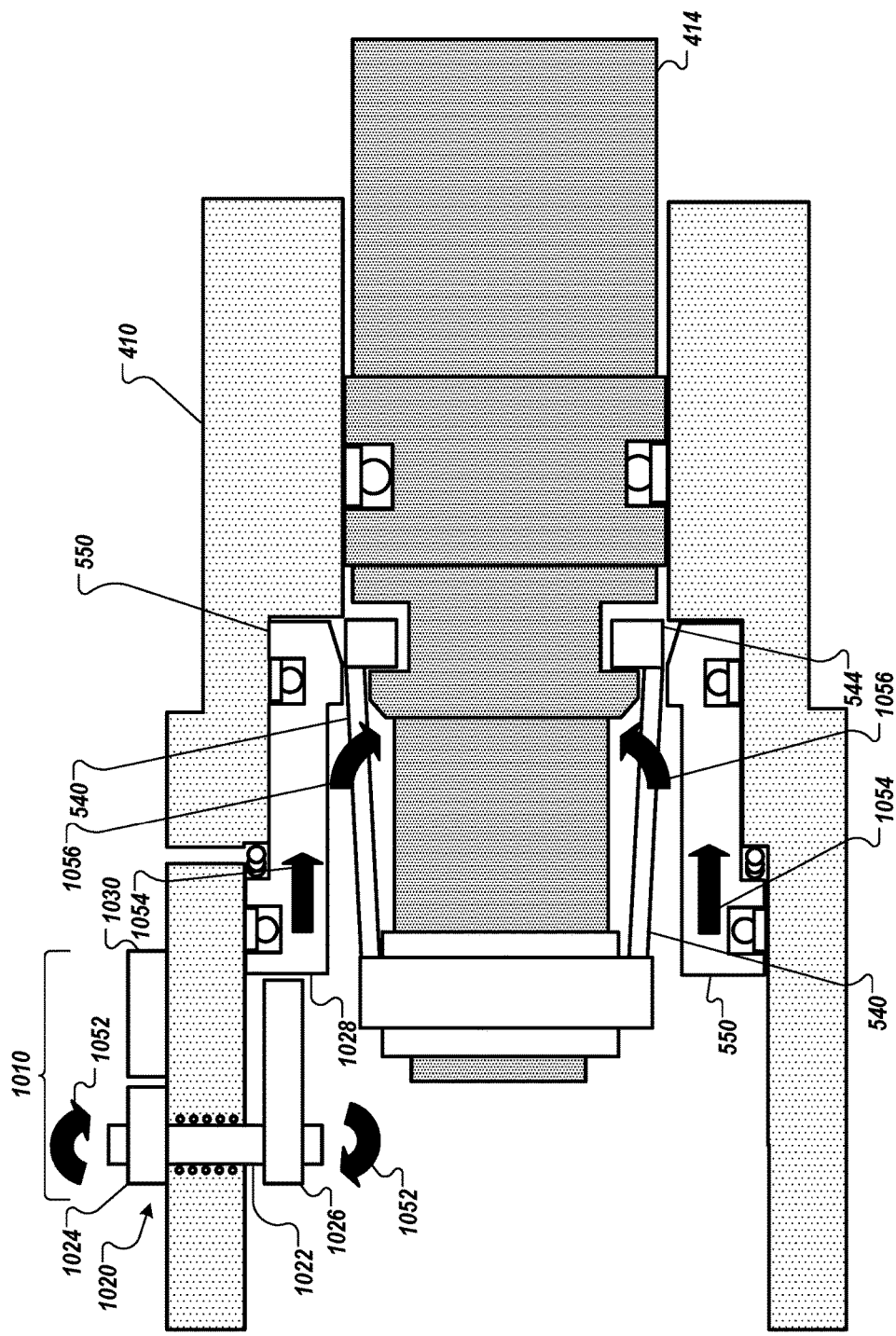

FIGS. 10 and 11 are sectional views of another exemplary linear lock assembly 1000. The linear lock assembly 1000 is a modification of the example linear lock assembly 500 of FIGS. 5-9, with the inclusion of an override assembly 1010. In general, the override assembly 1010 is a mechanism that provides a way to manually disengage (e.g., unlock) the linear lock assembly 1000.

The override assembly 1010 includes a cam assembly 1020 and a sensor 1030. The cam assembly includes a shaft 1022 that extends through the housing 410 from a head 1024 to a cam 1026. The head 1024 is configured to be gripped or engaged by a tool or an operator's hand, and turned. For example, the head 1024 may be knurled to form a manual knob. In another example, the head 1024 may include a hexagonal hole that can be engaged by a hex wrench. In another example, the head 1024 may include an octagonal structure (e.g., a bolt head) that can be engaged by a box end wrench. The cam 1026 is arranged to contact an axial face 1028 of the sleeve 550.

In use, the head 1024 can be rotated, represented by arrows 1052 to cause the cam 1026 to rotate from a disengaged configuration (e.g., not manually or mechanically overridden) as shown in FIG. 10) to an engaged configuration (e.g., manually or mechanically overridden) as shown in FIG. 11. The cam 1026 is asymmetrical, and as the shaft 1022 rotates, the cam 1026 extends axially while contacting the axial face 1028. The rotation and extension of the cam 1026 urges axial movement, represented by arrows 1054, of the sleeve 550 away from the locked configuration (e.g., shown in FIG. 10) toward the locked configuration (e.g., as shown in FIG. 11). As described in previous paragraphs, movement of the sleeve 550 causes the sleeve 550 to contact the lock fingers 540 and urge the lock fingers 540 to move, as represented by arrows 1056, from the extended and locked position (e.g., shown in FIG. 10) toward the retracted and unlocked position (e.g., shown in FIG. 11).

The sensor 1030 is configured to detect the position of the cam assembly 1020 and therefore the position of the lock sleeve. A torsion spring 1025 is provided to urge the cam 1026 against the lock sleeve 550. The torsion spring 1025 is configure to provide less force than is sufficient force to override the lock spring 558. This arrangement assures that sensor 1030 indicates the status of the lock (locked or unlocked) under all operating conditions including fluid operation and manual override.

Figure 12:
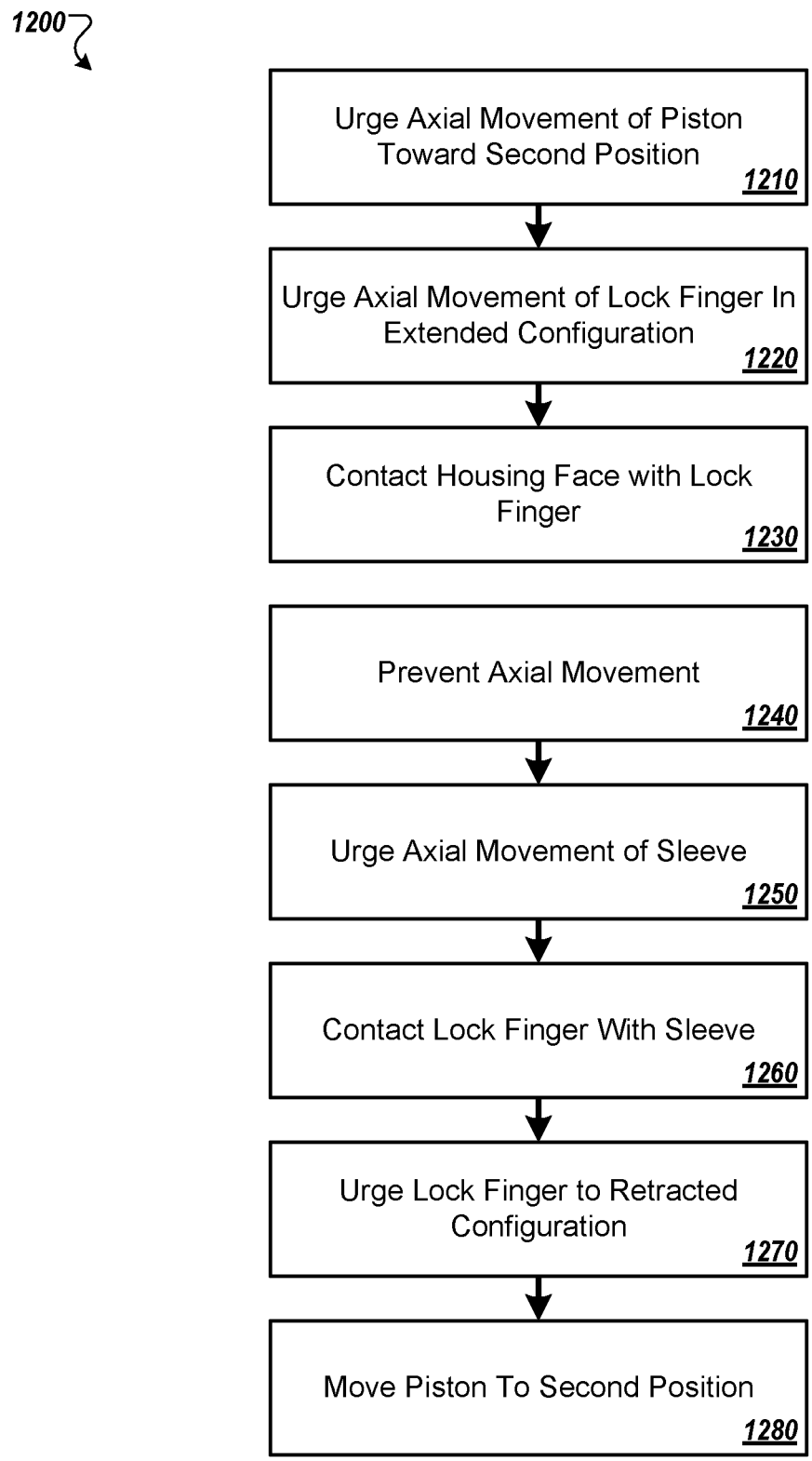
FIG. 12 is a flow diagram of an example process of locking a linear actuator.

FIG. 12 is a flow diagram of an example process 1200 of locking a linear actuator. In some implementations, the process 1200 can be used with the exemplary linear lock assembly 400 of FIGS. 4-9 or the exemplary linear lock assembly 1000 of FIGS. 10 and 11.

At 1210, axial movement of a piston is urged within an axial cavity defined by an inner surface of a housing. The piston has a first piston end and a second piston end axially opposite the first piston end. The piston is urged away from a first piston position and toward a second piston position. For example, as shown in FIG. 7, the piston rod 414 is urged in the direction of arrow 702.

In some implementations, urging axial movement of the piston within the axial cavity defined by the inner surface of the housing away from the first piston position toward the second piston position further can include applying fluid pressure to a pressure chamber that is at least partly defined by the inner surface, the piston, and a piston seal arranged in sealing contact with the piston and the inner surface. For example, pressurized fluid can be applied to the pressure chamber 530 to urge extension of the piston rod 414 relative to the housing 410 (e.g., in the direction of arrow 702 of FIG. 7).

At 1220, axial movement of a lock finger is urged by the piston. The lock finger is affixed to the first piston end at a first finger end and extends away from the piston to a second finger end in an extended configuration. For example, the lock fingers 540 are affixed to piston end 520 at the finger ends 542, and extend away from the piston rod 414 to the finger ends 544. The lock fingers 540 move along with the piston rod 414 as the piston rod 414 moves axially.

At 1230, the second finger end contacts a face defined by the inner cavity between a first housing portion wherein the axial cavity has a first lateral size to a second housing portion wherein the axial cavity has a second lateral size that is larger than the first lateral size. For example, the inner surface 502 defines the axial face 510 at the transition between the housing portion 506 and the housing portion 508. As the piston rod 414 and the lock fingers 540 move, the finger ends 544 contact the face 510.

At 1240, the contacting prevents movement of the piston to the second piston position. For example, with reference to FIG. 5, the piston rod 414 would not be able to extend due to contact between the finger ends 544 and the face 510. Such contact provides a mechanical interference that prevents extension of the piston rod 414 relative to the housing 410.

In some implementations, preventing, by the contacting, movement of the piston to the second piston position can also include contacting, by the second finger end, a second face defined by the piston, and transferring, by the second finger end, an axial force of the piston to the housing. For example, the force of movement of the piston rod 414 can be transferred from the axial face portion 546, through the finger end 544 to the face 510.

At 1250, a sleeve is urged to move axially from a first sleeve position to a second sleeve position within the axial cavity. For example, the sleeve 550 is moved from the example position shown in FIG. 5 to the example position shown in FIG. 6, in the direction indicated by arrows 604.

In some implementations, urging movement of the sleeve axially from the first sleeve position to the second sleeve position within the axial cavity can include applying fluid pressure to the pressure chamber. For example, the sleeve 550 can be moved from the example position shown in FIG. 5 to the example position shown in FIG. 6, in the direction indicated by arrows 604 by fluid pressure applied to the pressure chamber 530. In some implementations, the sleeve can be moved axially by a bias provided by a spring or other such compliant member, such as the compliant member 558.

At 1260, the sleeve contacts the lock finger. For example, as shown in FIG. 6, the sleeve 550 is in contact with the lock fingers 540.

At 1270, the sleeve urges the lock finger from the extended configuration to a retracted configuration in which the lock finger fits within the first housing portion. For example, as shown in FIGS. 6-8, the lock fingers 540 have been retracted to fit within the cavity 504.

At 1280, the piston is moved to the second piston position. For example, as shown in FIG. 7, with the lock fingers 540 in the retracted position, the piston rod 414 can be extended in the direction of arrow 702.

In some implementations, the process 1200 can include urging movement of the sleeve axially from the second sleeve position to the first sleeve position within the axial cavity, urging the piston away from the second piston position to the first piston position, passing the second finger end out of the first housing portion, past the face, into the second housing portion, and extending the lock finger away from the piston from the retracted configuration to the extended configuration. For example, the piston rod 414 can be retracted from the example position shown in FIG. 8, toward the example position shown in FIG. 9 (e.g., in the direction of arrow 902). As the finger ends 544 clear the housing portion 506, they can extend (e.g., snap) into the extended, locked configuration shown in FIG. 9.

In some implementations, extending the lock finger away from the piston from the retracted configuration to the extended configuration can include extending, by a bias member, the lock finger away from the piston from the retracted configuration to the extended configuration. For example, the lock fingers 540 can include a spring (not shown) configured to urge extension of the finger ends 544 away from the piston rod 414. In another example, the lock finger itself may be made of a spring material and can be configured to urge extension of the finger ends 544 away from the piston rod 414.

In some implementations, urging movement of the sleeve axially from the second sleeve position to the first sleeve position within the axial cavity can include applying fluid pressure to a pressure chamber defined by the inner surface, an outer surface of the sleeve, a first seal arranged in sealing contact with the inner surface and the outer surface of the sleeve, and a second seal arranged in sealing contact with the inner surface and the outer surface of the sleeve. For example, pressurized fluid can be applied to the pressure chamber 556 to move the sleeve 550 in the direction of arrow 802 of FIG. 8.

In some implementations, urging movement of the sleeve axially from the second sleeve position to the first sleeve position within the axial cavity can include, urging movement of the sleeve by a bias member configured to urge movement of the sleeve axially from the second sleeve position to the first sleeve position. For example, the compliant member 558 can be configured to bias the sleeve 550 toward the locked position.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A linear actuator lock apparatus, comprising:
    a housing having an inner surface defining an axial cavity comprising:
        a first housing portion wherein the axial cavity has a first lateral size;
        a second housing portion wherein the axial cavity has a second lateral size that is larger than the first lateral size; and
        a face defined by the inner surface from the first housing portion to the second housing portion;
    a piston having a first piston end and a second piston end axially opposite the first piston end, wherein the piston is configured for axial movement within the axial cavity between a first piston position and a second piston position;
    a lock finger affixed to the first piston end at a first finger end and extending away from the piston to a second finger end, wherein the second finger end is configured to contact the face axially and contact the piston axially in an extended configuration and fit within the first housing portion in a retracted configuration; and
    a sleeve arranged within the second housing portion and configured to move axially within the second housing portion between a first sleeve position in which the lock finger is permitted to extend to the extended configuration and a second sleeve position configured to contact the lock finger and urge the lock finger to the retracted configuration.

2. The apparatus of claim 1, wherein the lock finger is configured to prevent movement of the piston toward the second piston position in the extended configuration, and permit movement of the piston toward the second piston position in the retracted configuration.

3. The apparatus of claim 1, further comprising a bias member configured to bias the lock finger away from the retracted configuration and toward the extended configuration.

4. The apparatus of claim 1, wherein the sleeve defines an axial bore, and the first piston end is configured to at least partly extend within the axial bore in the second sleeve position.

5. The apparatus of claim 1, further comprising a first seal arranged in sealing contact with the inner surface and an outer surface of the sleeve, and a second seal arranged in sealing contact with the inner surface and the outer surface of the sleeve, wherein a pressure chamber is defined by the inner surface, the face, the outer surface, the first seal, and the second seal.

6. The apparatus of claim 1, further comprising a bias member configured to urge the sleeve toward the first sleeve position.

7. The apparatus of claim 1, further comprising a pressure chamber at least partly defined by the inner surface, the piston, and a piston seal arranged in sealing contact with the piston and the inner surface.

8. The apparatus of claim 7, wherein the piston is configured to be urged from the first piston position toward the second piston position by fluid pressure provided within the pressure chamber.

9. The apparatus of claim 8, wherein the sleeve is configured to be urged from the first sleeve position toward the second sleeve position by fluid pressure provided within the pressure chamber.

10. The apparatus of claim 1, wherein the housing is configured to be affixed to an aircraft structure and the second piston end is configured to be affixed to a moveable aircraft component.

11. A method of locking a linear actuator, the method comprising:
    urging axial movement of a piston within an axial cavity defined by an inner surface of a housing, away from a first piston position and toward a second piston position, wherein the piston has a first piston end and a second piston end axially opposite the first piston end;
    urging, by the piston, axial movement of a lock finger affixed to the first piston end at a first finger end and extending away from the piston to a second finger end in an extended configuration;
    contacting, by the second finger end, a face defined by the inner surface between a first housing portion wherein the axial cavity has a first lateral size to a second housing portion wherein the axial cavity has a second lateral size that is larger than the first lateral size;
    preventing, by the contacting, movement of the piston to the second piston position, the preventing comprising:
        contacting, by the second finger end, a second face defined by the piston; and
        transferring, by the second finger end, an axial force of the piston to the housing;
    urging movement of a sleeve axially from a first sleeve position to a second sleeve position within the axial cavity;
    contacting, by the sleeve, the lock finger;
    urging, by the sleeve, the lock finger from the extended configuration to a retracted configuration in which the lock finger fits within the first housing portion; and
    moving the piston to the second piston position.

12. The method of claim 11, further comprising applying fluid pressure to a pressure chamber that is at least partly defined by the inner surface, the piston, and a piston seal arranged in sealing contact with the piston and the inner surface.

13. The method of claim 11, further comprising urging movement of the sleeve by a spring bias.

14. The method of claim 11, further comprising:
urging movement of the sleeve axially from the second sleeve position to the first sleeve position within the axial cavity;
urging the piston away from the second piston position to the first piston position;
passing the second finger end out of the first housing portion, past the face, into the second housing portion; and
extending the lock finger away from the piston from the retracted configuration to the extended configuration.

15. The method of claim 14, further comprising extending, by a bias member, the lock finger away from the piston from the retracted configuration to the extended configuration.

16. The method of claim 14, further comprising applying fluid pressure to a pressure chamber defined by the inner surface, an outer surface of the sleeve, a first seal arranged in sealing contact with the inner surface and the outer surface of the sleeve, and a second seal arranged in sealing contact with the inner surface and the outer surface of the sleeve.

17. The method of claim 14, further comprising urging movement of the sleeve by a bias member configured to urge movement of the sleeve axially from the second sleeve position to the first sleeve position.

18. A thrust reverser actuator system comprising:
an airframe structure;
a thrust reverser cowl configured to move relative to the airframe structure;
a linear actuator configured to move the thrust reverser cowl relative to the airframe structure, and comprising:
a housing having an inner surface defining an axial cavity comprising:
a first housing portion wherein the axial cavity has a first lateral size;
a second housing portion wherein the axial cavity has a second lateral size that is larger than the first lateral size; and
a face defined by the inner surface from the first housing portion to the second housing portion;
a piston having a first piston end and a second piston end axially opposite the first piston end, wherein the piston is configured for axial movement within the axial cavity between a first piston position and a second piston position; and
a lock apparatus comprising:
a lock finger affixed to the first piston end at a first finger end and extending away from the piston to a second finger end, wherein the second finger end is configured to contact the face axially and contact the piston axially in an extended configuration and fit within the first housing portion in a retracted configuration; and
a sleeve arranged within the second housing portion and configured to move axially within the second housing portion between a first sleeve position in which the lock finger is permitted to extend to the extended configuration and a second sleeve position configured to contact the lock finger and urge the lock finger to the retracted configuration.

19. The system of claim 18, wherein the lock finger is configured to prevent movement of the piston toward the second piston position in the extended configuration, and permit movement of the piston toward the second piston position in the retracted configuration.

20. The system of claim 18, further comprising a pressure chamber at least partly defined by the inner surface, the piston, and a piston seal arranged in sealing contact with the piston and the inner surface, wherein the piston is configured to be urged from the first piston position toward the second piston position by fluid pressure provided within the pressure chamber.

* * * * *